(12) United States Patent
Benson et al.

(10) Patent No.: US 8,499,659 B2
(45) Date of Patent: Aug. 6, 2013

(54) GEARBOX WITH MULTI-FUNCTION QUILL

(75) Inventors: Ryan Benson, Dubuque, IA (US);
Donald O. Johannsen, Dubuque, IA (US); Denis J. Roling, Dubuque, IA (US)

(73) Assignee: Deere & Company, Moline, IL (US)

( * ) Notice: Subject to any disclaimer, the term of this patent is extended or adjusted under 35 U.S.C. 154(b) by 1 day.

(21) Appl. No.: 13/248,651

(22) Filed: Sep. 29, 2011

(65) Prior Publication Data
US 2013/0081495 A1 Apr. 4, 2013

(51) Int. Cl.
*F16H 1/20* (2006.01)
(52) U.S. Cl.
USPC .......................... 74/411.5; 188/72.3; 188/170
(58) Field of Classification Search
USPC ..... 74/411.5, 421 A, 421 R, 606 R; 188/71.5, 188/72.3, 170; 180/9.62
See application file for complete search history.

(56) References Cited

U.S. PATENT DOCUMENTS

| | | | | |
|---|---|---|---|---|
| 3,863,038 A | * | 1/1975 | Kreitner et al. | 188/170 |
| 4,263,991 A | * | 4/1981 | Morgan et al. | 188/170 |
| 6,260,668 B1 | * | 7/2001 | McClanahan | 188/71.5 |
| 6,357,558 B1 | * | 3/2002 | Case et al. | 188/71.5 |
| 7,258,208 B1 | * | 8/2007 | Dennis et al. | 188/170 |
| 7,493,992 B2 | * | 2/2009 | Rogers | 188/71.5 |
| 2009/0095578 A1 | | 4/2009 | Besler | |

OTHER PUBLICATIONS

1st Crawler Final Drive (1 page) (Dec. 2007).
2nd Crawler Final Drive (1 page) (Feb. 2010).
Background Information (1 page)(admitted as prior art before Sep. 29, 2011).

* cited by examiner

*Primary Examiner* — William C Joyce

(57) ABSTRACT

A gearbox comprises a multi-function quill. The quill is provided for loading a bearing and limiting brake-releasing movement of a piston of a brake release.

13 Claims, 11 Drawing Sheets

US 8,499,659 B2

GEARBOX WITH MULTI-FUNCTION QUILL

FIELD OF THE DISCLOSURE

The present disclosure relates to a gearbox that may be used in propulsion of a work vehicle.

BACKGROUND OF THE DISCLOSURE

Gearboxes have been used in the propulsion of many different types of work vehicles. For example, gearboxes have been used as a final drive that provides a speed reduction and a torque increase from a propulsion input coupled to the final drive to a propulsion output coupled to the final drive.

SUMMARY OF THE DISCLOSURE

According to the present disclosure, there is provided a gearbox. The gearbox comprises a housing, a bearing positioned within the housing, a shaft positioned within the bearing to rotate relative to the housing about a rotation axis, a gear set positioned within the housing and operably coupled to the shaft, a brake for braking rotation of the shaft about the rotation axis, a hydraulic brake release for releasing the brake to rotate about the rotation axis, and an annular quill mounted to the housing. The brake release comprises a piston configured to move axially toward the quill to release the brake in response to hydraulic pressure. The quill is positioned in contact with the bearing so as to load the bearing axially relative to the rotation axis and positioned to limit axial, brake-releasing movement of the piston relative to the rotation axis.

The gearbox may be for use in propulsion of a work vehicle. In such a case, the gearbox may be a final drive for the work vehicle so as to be configured to provide a rotary speed reduction from a propulsion input of the work vehicle to a propulsion output of the work vehicle.

The quill may comprise at least one ear positioned to limit axial, brake-releasing movement of the piston relative to the rotation axis.

The quill comprises an annular disk extending radially along a wall of the housing relative to the rotation axis, a ring projecting from the disk in a first axial direction radially between the bearing and the housing wall relative to the rotation axis, and ears projecting from the disk in a second axial direction opposite the first axial direction relative to the rotation axis to limit brake-releasing movement of the piston in the first axial direction. The disk and the ring may cooperate to provide an annular cup in which an outer race of the bearing is nested. The ears may project axially from the disk relative to the rotation axis to limit axial, brake-releasing movement of the piston relative to the rotation axis.

The disk may comprise an outer portion radially outwardly from the ring relative to the rotation axis and an inner portion radially inward from the ring relative to the rotation axis. The inner portion and the ring may cooperate to provide the cup. The ears may project axially from the outer portion relative to the rotation axis.

The gearbox may comprise springs urging yieldably the brake toward a braking configuration. The quill may comprise spring-receiving holes receiving respectively the springs.

The outer portion of the disk may comprise the spring-receiving holes. The spring-receiving holes may be spaced circumferentially relative to the rotation axis and extend axially through the disk relative to the rotation axis. The springs may be positioned respectively in the spring-receiving holes. The outer portion comprises notches spaced circumferentially about its radially outer periphery relative to the rotation axis for fluid to flow therethrough between the quill and the housing.

The ears may be spaced circumferentially relative to the rotation axis. The ears may be positioned radially outwardly from the springs relative to the rotation axis.

The gearbox may comprise a reaction plate. The brake and the piston may be positioned on a first side of the reaction plate in contact with the reaction plate. The quill and the springs may be positioned on a second side of the reaction plate opposite the first side. The springs may contact the reaction plate so as to urge yieldably the brake toward a braking configuration. The ears may contact the reaction plate so as to limit axial, brake-releasing movement of the piston relative to the rotation axis when the brake release is activated.

The gearbox may comprise a dowel. The brake may comprise at least one brake plate comprising a notch receiving the dowel. An ear of the ears may comprise a notch angularly aligned with the dowel relative to the rotation axis. A radially outer surface of that ear relative to the rotation axis may comprise the notch.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
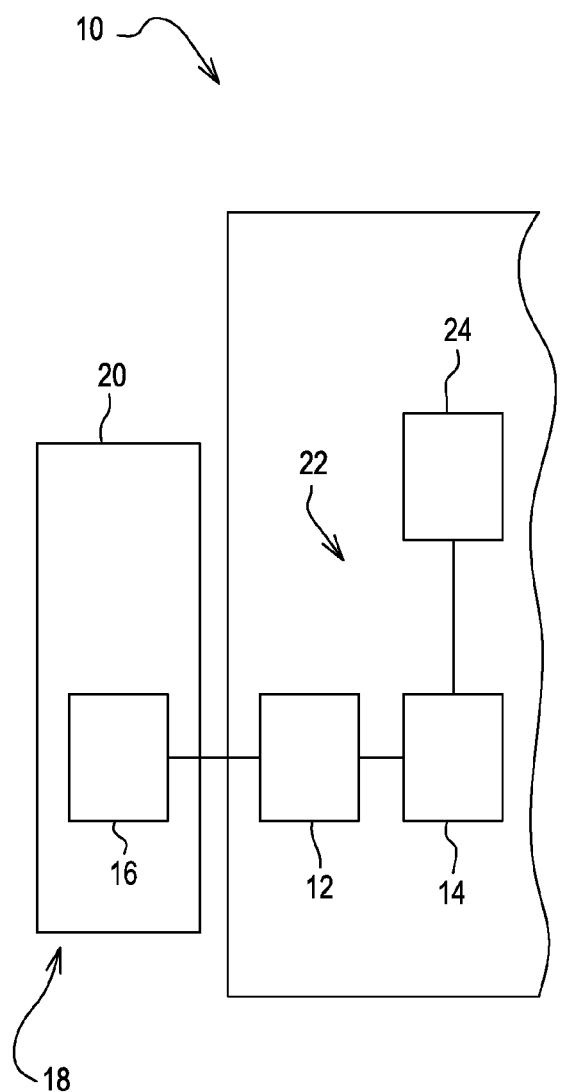
FIG. 1 is a diagrammatic view of a work vehicle.
Figure 2:
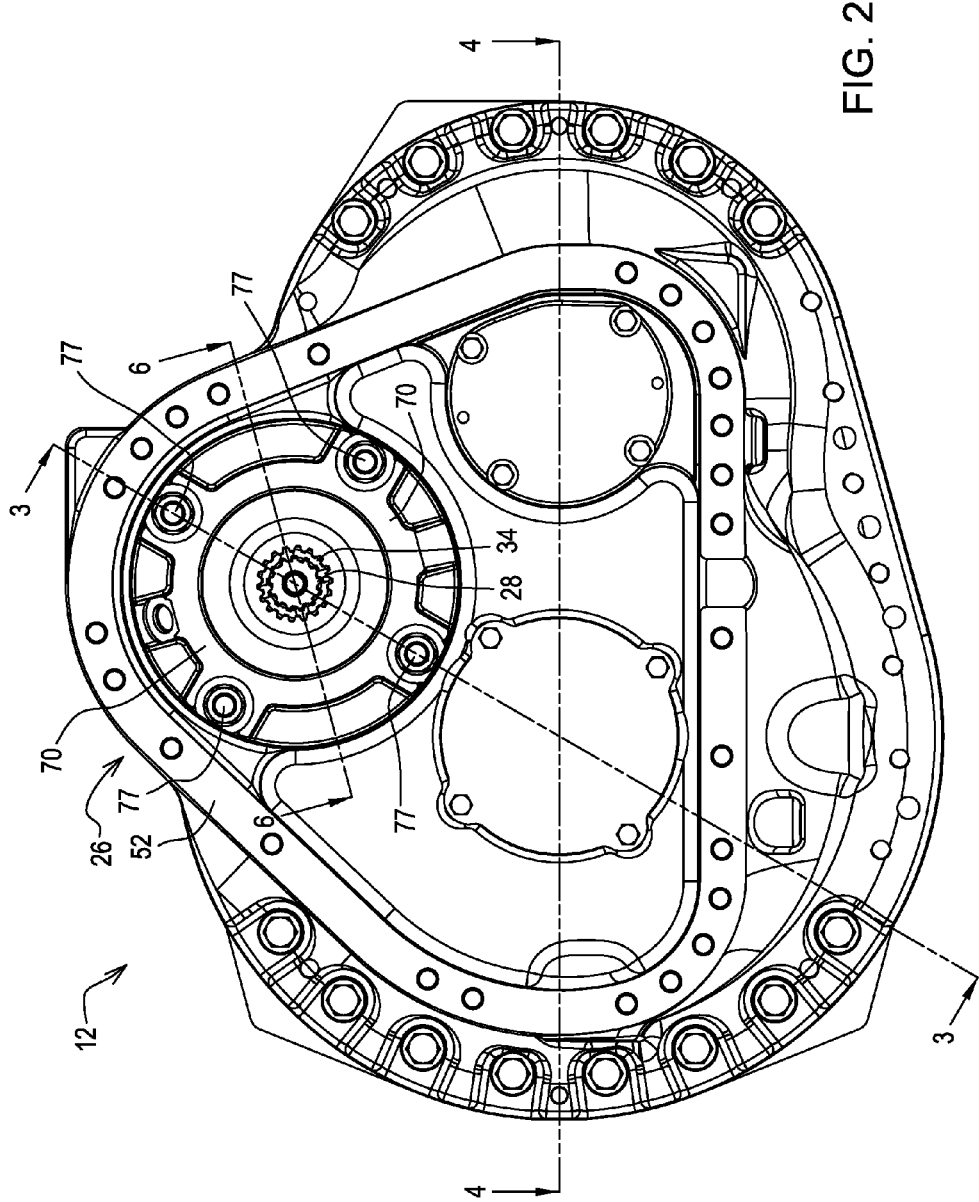
FIG. 2 is an elevation view showing a gearbox for use in propulsion of the work vehicle.

Referring to FIGS. 1 and 2, a work vehicle 10 has a gearbox 12. The gearbox 12 may be used in propulsion of the work vehicle 10. In such a case, the gearbox may be, for example, a final drive for the work vehicle 10 so as to be configured to provide a rotary speed reduction, and corresponding torque increase, from a propulsion input 14 of the work vehicle 10 to a propulsion output 16 of the work vehicle 10.

In the illustrated example, the work vehicle 12 is a track-type vehicle (e.g., a crawler dozer or crawler loader). In such a case, the vehicle 10 has two track assemblies 18 positioned on opposite sides of the vehicle 12, one of which is shown diagrammatically in FIG. 1. Each track assembly 18 has an endless ground-engaging track 20 trained about rotary elements of the track assembly 18 including a drive sprocket configured to engage the track 20 drivingly and positioned at the rear of the track assembly 18 or some other suitable location. The drive sprocket of each track assembly 18 provides a propulsion output 16.

The vehicle 10 has two hydrostatic transmissions 22, one of which is shown diagrammatically in FIG. 1. Each hydrostatic transmission 22 has a hydraulic pump 24 and a hydraulic motor that is coupled fluidly to the pump 24 and that provides a propulsion input 14. The pumps 24 are driven by an internal combustion engine (not shown) of the vehicle 12 via a gearbox (not shown). In other track-type vehicle examples, one or more electric drives may be used respectively in place of the hydrostatic transmissions, with an electric motor as the propulsion input 14 for each gearbox 12.

In other examples, the vehicle 10 may be a wheeled vehicle, with the gearbox 12 driven mechanically by an axle, hydraulically by a hydraulic motor, electrically by an electric motor, or the like. In such a case, the motor or axle provides a propulsion input and the associated wheel provides a propulsion output.

For the sake of providing an example, the propulsion input 14 and the propulsion output 16 are described below respectively as a motor and a sprocket.

Figure 3:
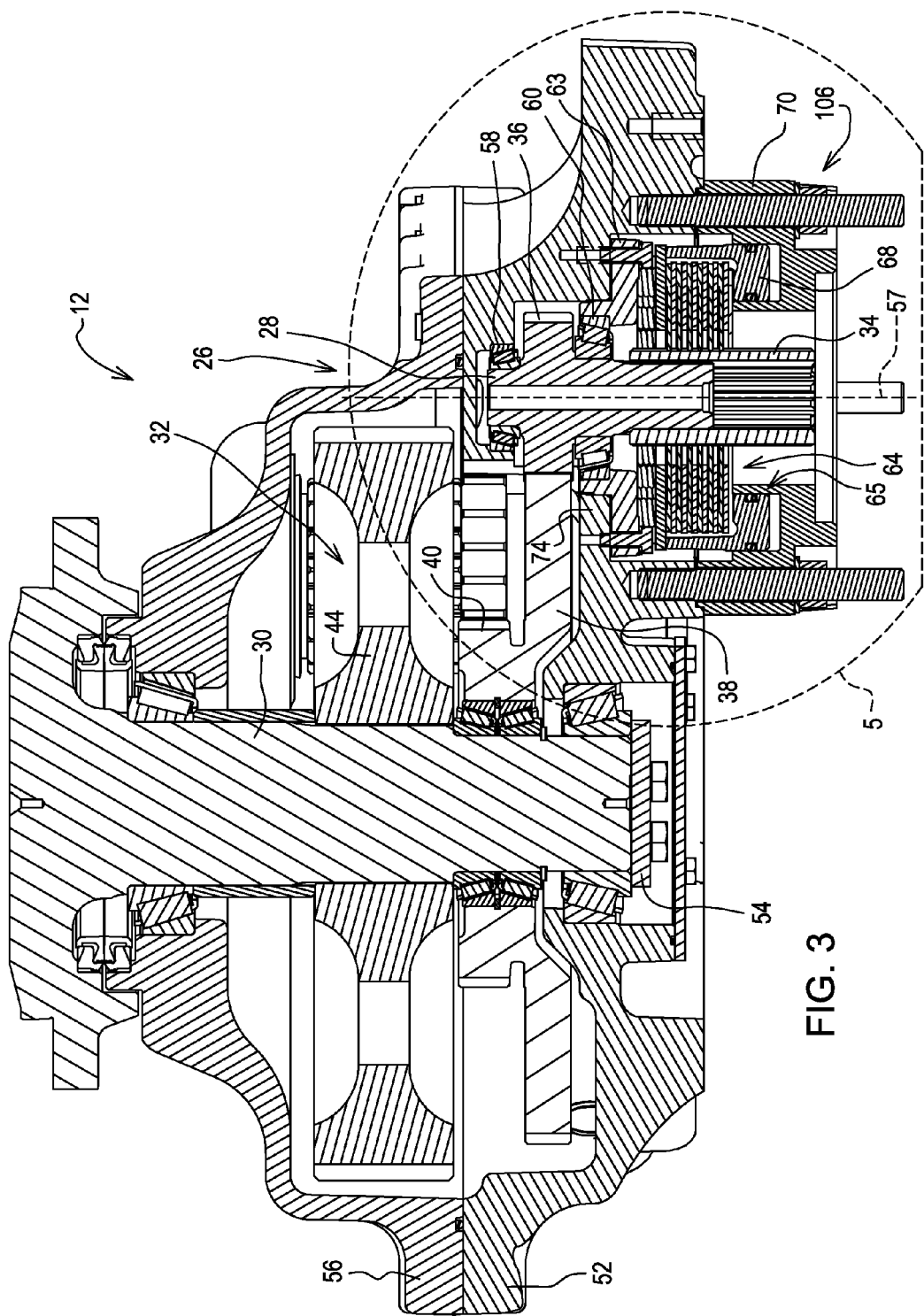
FIG. 3 is a sectional view taken along lines 3-3 of FIG. 2.

Referring to FIG. 3, by way of example, the gearbox 12 is illustrated as a left-hand gearbox for use as a final drive on the left-hand side of the vehicle 10. It is to be understood that a corresponding right-hand gearbox may be used as a final drive on the right-hand side of the vehicle 10.

The gearbox 12 has a housing 26, a first or input shaft 28, a second or output shaft 30, and a gear set 32 operably coupled to the shafts 28, 30 and configured to provide a speed reduction and torque increase from the input shaft 28 to the output shaft 30. A tubular coupler 34 may be splined to the first shaft 28 and to the output shaft of a respective motor 14 (propulsion input) so as to couple the motor 14 and the shaft 28 together mechanically. The output shaft 28 may have a flange to which sprocket segments may be bolted circumferentially therearound to provide a sprocket 16 (propulsion output).

Figure 4:
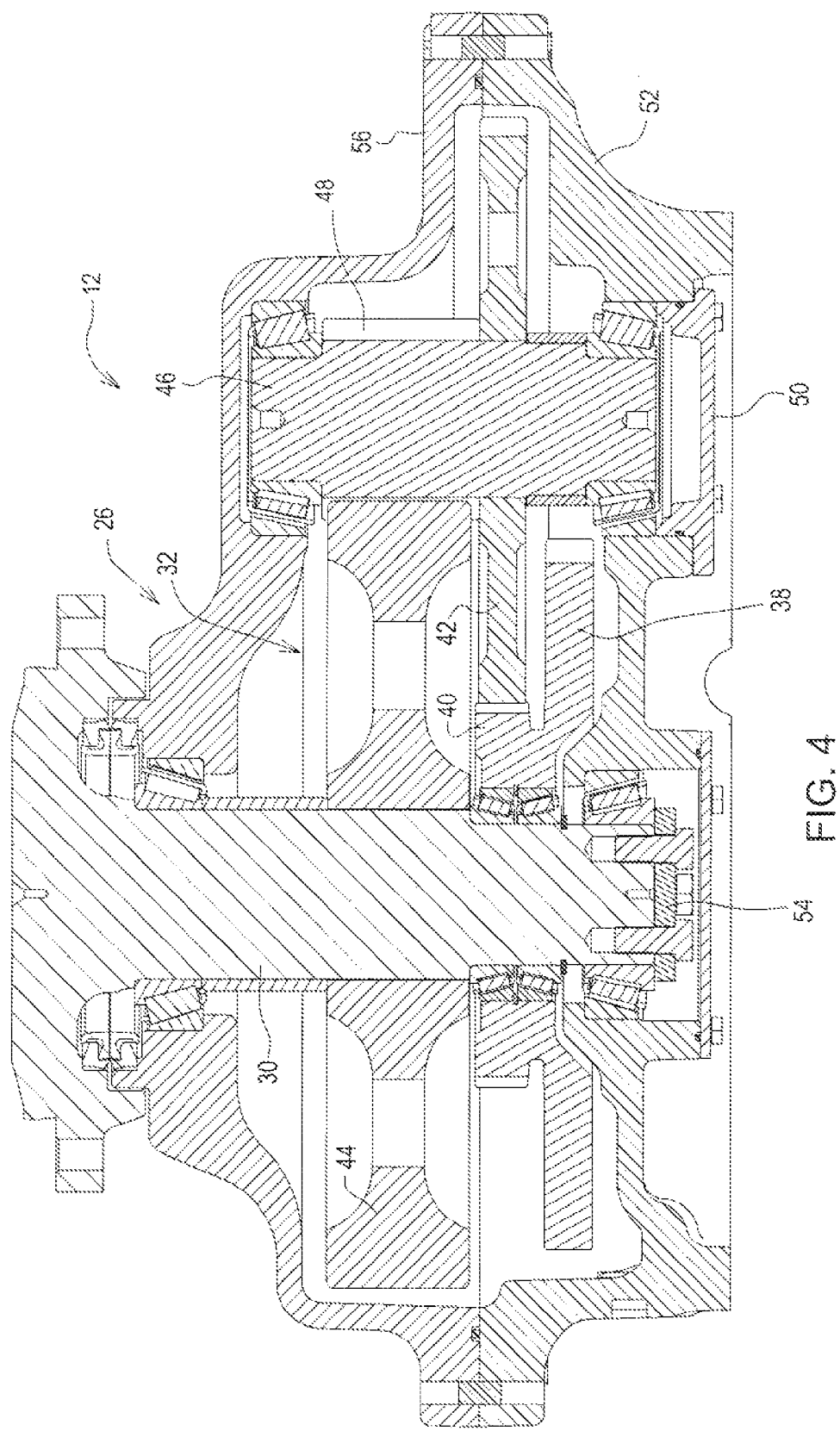
FIG. 4 is a sectional view taken along lines 4-4 of FIG. 2.

Referring to FIGS. 3 and 4, in the illustrated example the gear set 32 has a number of gears cooperating to provide a speed reduction and a torque increase. The gear set 32 includes gears 36, 38, 40, 42, 44 and a pinion shaft 46. The gear 36 is an input gear mounted on the input shaft 28 (e.g., integral therewith). The gears 38, 40 cooperate to provide a cluster gear rotatably mounted on the output shaft 30 via two bearings (e.g., rolling-element bearings, such as, for example, tapered roller bearings). The gear 42 is splined onto the pinion shaft 46. The gear 44 is splined onto the output shaft 30. The gears 36, 38 mesh with one another. The gear 38 is larger in diameter than the gear 36 and the gear 40. The gears 40, 42 mesh with one another, the gear 42 larger in diameter than the gear 40. The gear 44 meshes with gear teeth 48 of the pinion shaft 46, the gear 44 larger in diameter than the pinion shaft 46 at its gear teeth 48. The power flow is thus from the input shaft 28 sequentially through the gear 36, the gear 38, the gear 40, the gear teeth 48 of the pinion shaft 46, and the gear 44 to the output shaft 30. One of ordinary skill in the art will recognize that the gear set 32 can be configured in a wide variety of ways to achieve a desired speed and/or torque output.

Referring to FIG. 4, the pinion shaft 46 is mounted within the housing 26 for rotation relative thereto about its rotation axis. The pinion shaft 46 is positioned within two bearings (e.g., rolling-element bearings, such as, for example, tapered roller bearings) at opposite ends of the shaft 46. A cover 50 of the housing 26 is fastened to a first body 52 of the housing 26 (e.g., with four threaded bolts received in respective threaded holes of the first housing body 52) and contacts one of the bearings to load the bearing axially relative to the rotation axis of the pinion shaft 46 to limit axial endplay of the pinion shaft 46. One or more shims may be positioned between the cover 50 and the first housing body 52 to set the desired axial load on that bearing.

The output shaft 30 is mounted within the housing 26 to rotate relative thereto about its rotation axis. The shaft 30 is positioned within two bearings (e.g., rolling-element bearings, such as, for example, tapered roller bearings) at opposite ends of the shaft 30 to rotate relative to the housing 26 about its rotation axis. An end plate 54 is fastened to an end of the shaft 30 (e.g., with four threaded bolts received in respective threaded holes of the shaft 30) in contact with one of the bearings to load the bearing axially relative to the rotation axis of the shaft 30 to limit axial endplay of the shaft 30. The shaft 30 extends through a hole of a second body 56 of the housing 26, the first and second housing bodies 52, 56 fastened to one another (e.g., with threaded bolts) (dowels may be used between the two housing bodies 52, 56, as shown, for example, at the top and bottom of FIG. 4, to allow for tighter tolerancing than a bolt, to facilitate alignment of the two housing bodies 52, 56 during assembly correct, and to provide a datum for bearing bores to keep gears aligned).

The cluster gear with the gears 38, 40 is mounted to the output shaft 30 to rotate relative to the shaft 30 about the rotation axis of the output shaft 30. The cluster gear is positioned on two bearings (e.g., rolling-element bearings, such as, for example, tapered roller bearings) positioned on the shaft 30.

Figure 5:
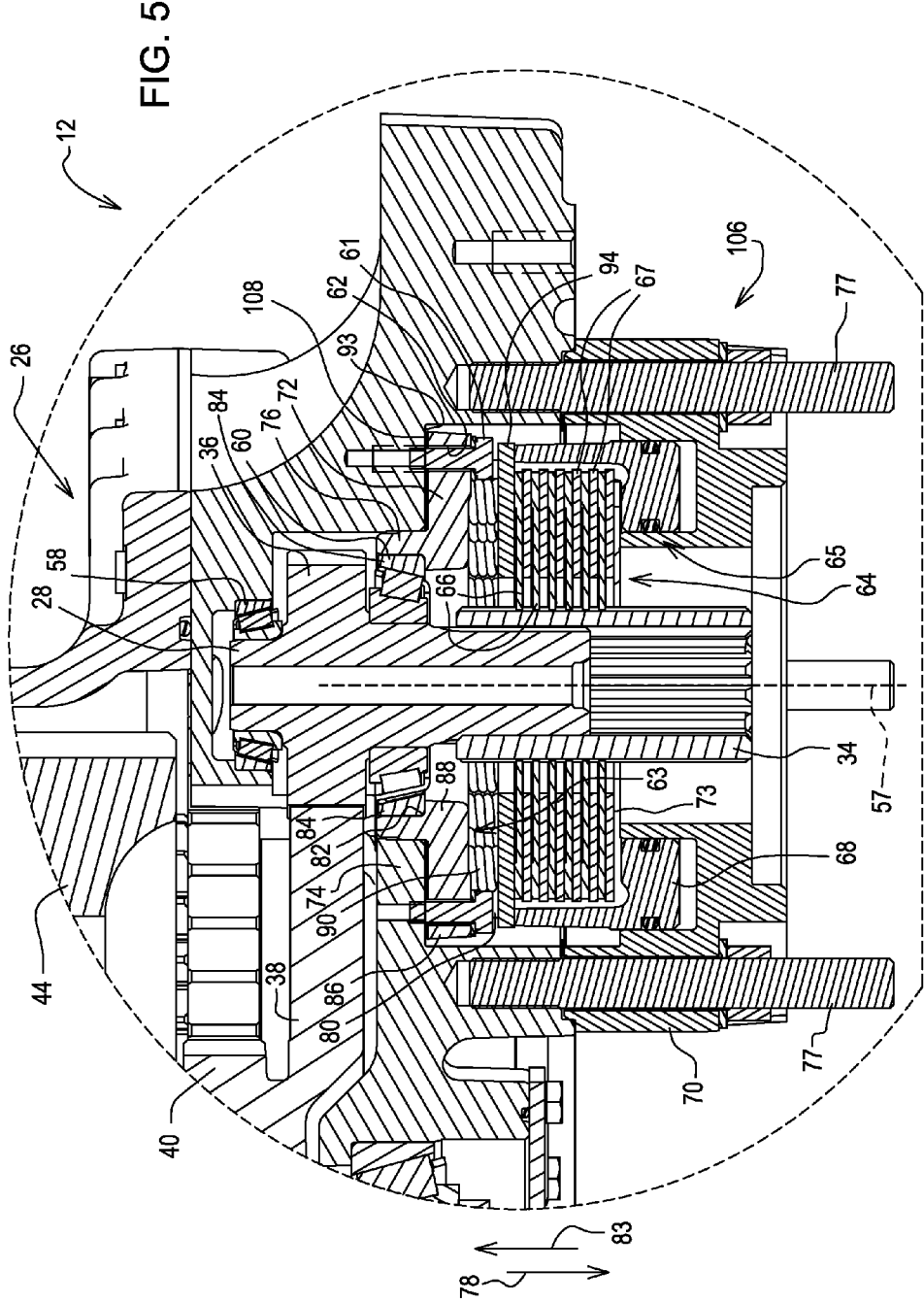
FIG. 5 is an enlarged view of region 5 of FIG. 3.

Referring to FIG. 5, the input shaft 28 is mounted within the first housing body 56 of the housing 26 in a manner so as to limit its axial endplay relative to a rotation axis 57 of the input shaft 28. The gearbox 12 has a first bearing 58 and a second bearing 60 (e.g., both rolling-element bearings, such as, for example, tapered roller bearings), which are positioned within the first housing body 52 of the housing 26. The input shaft 28 is positioned within the bearings 58, 60 to rotate relative to the housing 26 about the rotation axis 57.

An annular quill 63 is mounted to the first housing body 52 of the housing 26. The quill 63 is positioned in contact with the second bearing 60 so as to load the bearing 60 axially relative to the axis 57 to limit axial endplay of the shaft 28. The quill 63 is fastened to the housing 26 with a number of fasteners 61 (e.g., four threaded bolts and four washers associated respectively with the bolts). Each fastener 61 extends through a respective hole 62 of the quill 63 into a threaded hole of the first housing body 52. One or more shims 108 may be positioned axially between the quill 63 and the first housing body 52 relative to the axis 57 in the event that there may be an axial clearance between the quill 63 and the first housing body 56 of the housing 26 relative to the axis 57 when the quill 63 is installed against the second bearing 60 (e.g., 6 shims 108 which have the same shape and collectively stack up nominally to about one millimeter thickness; different individual shim thicknesses, such as, for example, three different thickness sizes, may be used to provide the desired spacing).

The gearbox 12 has a brake 64 for braking rotation of the shaft 28 about the rotation axis 57 and a hydraulic brake release 65 for releasing the brake 64 to rotate about the rotation axis 57. The brake release 65 has a piston 68 configured to move axially toward the quill 63 relative to the axis 57 to release the brake 64 in response to hydraulic pressure. The hydraulic pressure is due to hydraulic fluid (e.g., hydraulic oil) introduced into an annular chamber defined between the piston 68 and a third body 70 of the housing 26 fastened to the first housing body 52, the hydraulic fluid introduced into the chamber through a port of the third housing body 70. The quill 63 is positioned to limit axial, brake-releasing movement of the piston 68 relative to the rotation axis 57. The piston may be constructed, for example, as a casting (e.g., nodular iron).

The third housing body 70 is fastened to the first housing body 52 with a number of fasteners 77 (e.g., four), each fastener 77 including a threaded stud extending through the third housing body 70 into a threaded hole of the first housing body 52, a nut threaded onto the stud, and a washer between the nut and the third housing body 70. Each stud is elongated to provide a motor mount for the motor 14. An annular seal made, for example, of cork rubber is positioned between the first and third housing bodies 52, 70 to establish a sealed connection therebetween.

The brake 64 has brake disks 66 and brake plates 67 (which may also be referred to as "separator plates" made, for example, of steel) interleaved with the brake disks 66 such that the brake disks 66 and the brake plates 67 provide a brake pack 73. The brake pack 73 is spring-biased to a braking configuration. The brake pack 73 relaxes so as to release the brake 64 when the brake release 65 is activated. Each brake disk 66 has friction material on both sides (e.g., fibrous material) and is splined to the coupler 34 for rotation therewith relative to the rotation axis 57.

Figure 6:
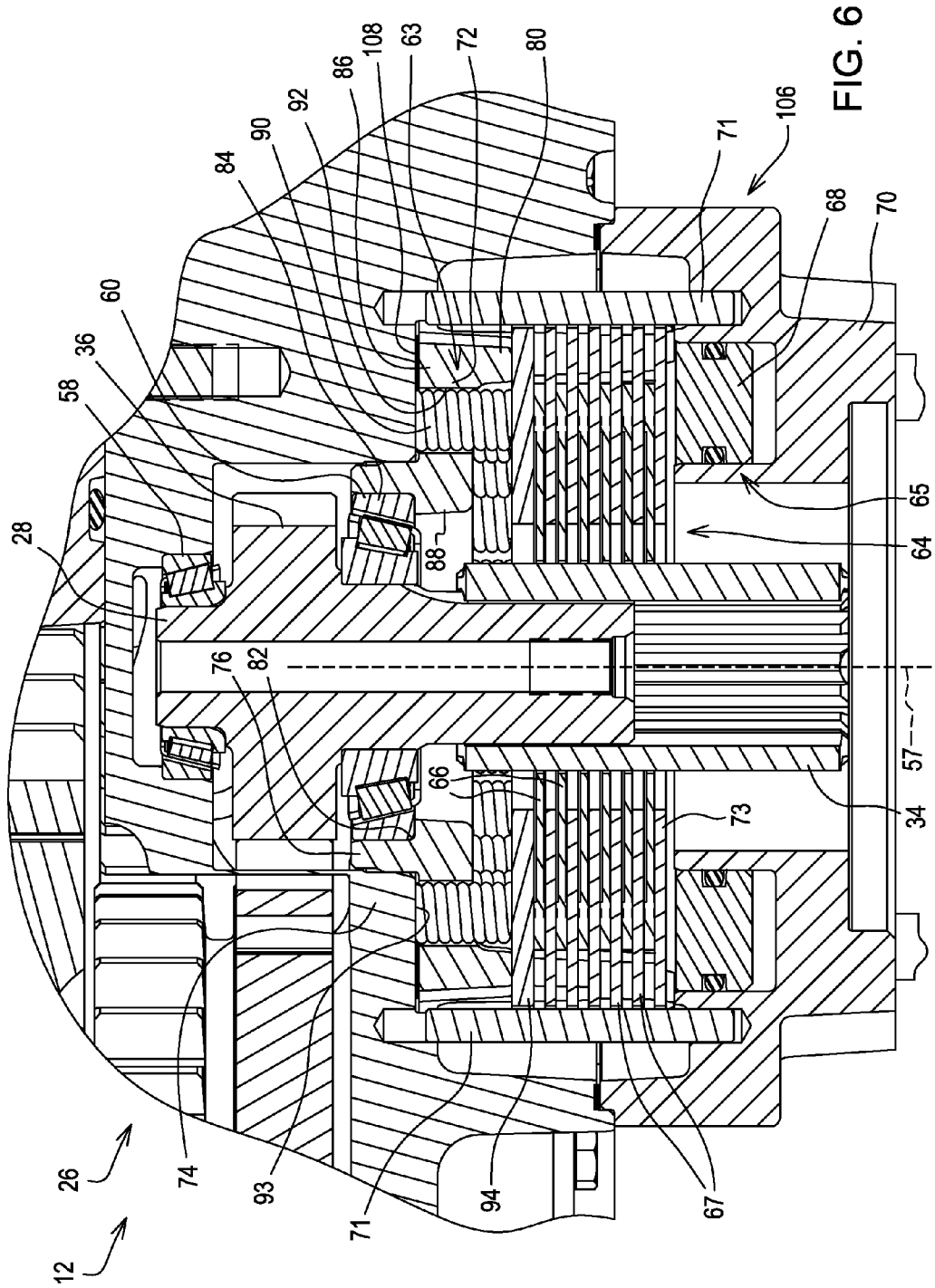
FIG. 6 is a sectional view taken along lines 6-6 of FIG. 2.
Figure 7:
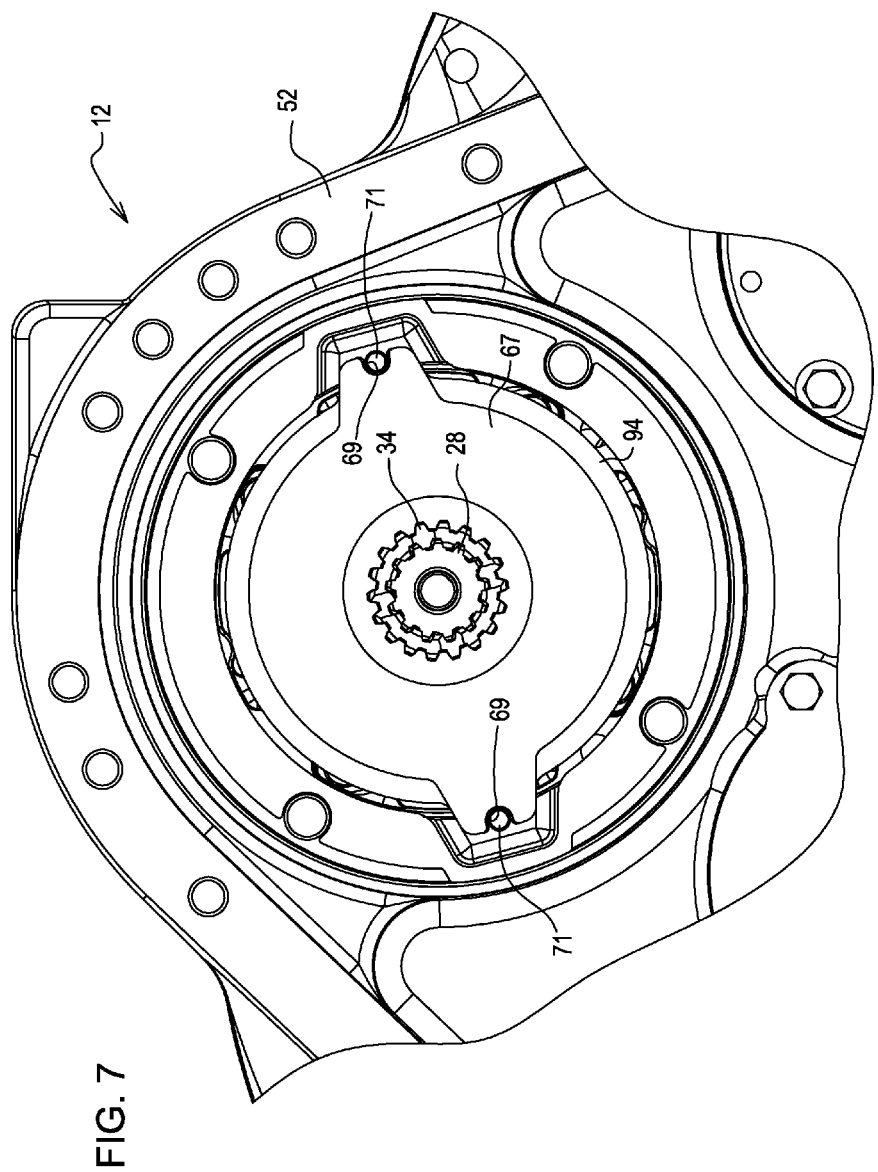
FIG. 7 is an elevation view showing two diametrically opposites dowels of the gearbox received in respective notches of radially projecting brake plate ears.

Referring to FIGS. 6 and 7, the brake plates 67 are doweled to the first and third housing bodies 52, 70 against rotation about the rotation axis 57. Each brake plate 67 has two ears circumferentially spaced about its periphery so as to be diametrically opposite to one another relative to the rotation axis 57, each ear having a notch 69. Each brake plate 67 thus, exemplarily, has two notches 69. The gearbox 12 has two unthreaded dowels 71 diametrically opposite to one another relative to the rotation axis 57 and received in respective holes in the first and third housing bodies 52, 70. The first dowel 71 extends through the first notch 69 of each brake plate 67, and the second dowel 71 extends through the second notch 69 of each brake plate 67. As such, each dowel 71 is received by a notch 69 of each brake plate 67. Use of two dowels 71 limits lateral movement of the plates 67 and thus lateral movement of the input shaft 28. A single dowel 71 may be used with a shaft 28 that is larger in order to compensate for the lateral forces.

Referring to FIGS. 5 and 6, the quill 63 has an annular disk 72 received within a cylindrical bore of the first housing body 52 (e.g., right circular cylinder) and extending radially along a wall 74 of the first housing body 52 of the housing 26 relative to the rotation axis 57, and a ring 76 projecting from the disk 72 in a first axial direction 78 radially between the second bearing 60 and the housing wall 74 relative to the rotation axis 57. The disk 72 and the ring 76 cooperate to provide an annular cup 82 in which an outer race 84 of the second bearing 80 is nested, each of the bearings 58, 60 having an inner race, an outer race 84, rolling elements positioned between the inner and outer races (e.g., tapered rollers), and a cage holding the rolling elements in spaced-apart relation to one another. The disk 72 comprises an outer portion 86 radially outwardly from the ring 76 relative to the axis 57 and an inner portion 88 radially inward from the ring 76 relative to the axis 57. The inner portion 88 and the ring 76 cooperate to provide the cup 82. The quill 63 may be constructed, for example, as a casting (e.g., gray iron), in which case the quill 63 may be cast and then machined.

The ring 76 has a chamfered pilot portion and a chamfered pilot-alignment portion. The pilot portion is adjacent to the disk 72 and is pressed into a hole in the wall 74. The pilot-alignment portion has a diameter smaller than that of the pilot portion, facilitating alignment of the pilot portion with that hole during assembly.

Referring to FIGS. 5, 6, 8, and 10, the quill 63 has at least one ear 80 positioned to limit axial, brake-releasing movement of the piston 68 relative to the rotation axis 57. Exemplarily, the quill 63 has plural ears 80 (e.g., four) projecting from the disk 72 in a second axial direction 83 opposite the first axial direction 78 relative to the rotation axis 57 to limit brake-releasing movement of the piston 68 in the first axial direction 78. Each ear 80 projects axially from the outer portion 86 relative to the rotation axis 57. Use of plural ears 80 provides for a relatively compact design of the quill 63, in that a notch 96 and a fastener-receiving hole 62 are positioned circumferentially between adjacent ears 80. Alternatively, the quill 63 could have a single, annular ear 80, such a quill 63 having a larger diameter to allow room for the holes 62 and the notches 96.

Referring to FIG. 6, the gearbox 12 has springs 90 urging yieldably the brake 64 toward a braking configuration. The outer portion 86 of the disk 72 has spring-receiving holes 92 spaced circumferentially relative to the rotation axis 57 and extending axially through the disk 72 relative to the rotation axis 57, as shown, for example, in FIGS. 8 and 10. The springs 90 are positioned respectively in the spring-receiving holes 92, such that the spring-receiving holes 90 receive respectively the springs 90. The ears 80 are spaced circumferentially relative to the rotation axis 57 and positioned radially outwardly from the springs 90 relative to the rotation axis 57. The holes 92 may be through-holes, in which case the springs 90 extend through the holes 92 into contact with a surface 93 of the housing wall 74. There may be, for example, 20 springs 90 and 20 spring-receiving holes 92, although it is understood that any suitable number of springs and spring-receiving holes may be employed.

The quill 63 and the springs 90 are aligned axially with the brake 64 and the brake release 65 relative to the rotation axis 57. The brake pack 73 and the piston 68 are positioned on a first side of a reaction plate 94 of the brake 64. The piston 68 contacts the reaction plate 94. The quill 63 and the springs 90 are positioned on a second side of the reaction plate 94 opposite the first side. The springs 90 contact the reaction plate 94 so as to urge yieldably the brake 64 toward the braking configuration. The brake pack 73 contacts the reaction plate 94 when the brake 64 is positioned in its braking configuration. The ears 80 contact the reaction plate 94 so as to limit axial, brake-releasing movement of the piston 68 relative to the rotation axis 57 when the brake release 65 is activated (FIG. 6). It is to be understood that the springs 90 will not yet have gone solid at the point that the ears 80 contact the reaction plate 94 (the springs 90 in the drawings should not be taken as having already gone solid; rather the springs 90 are shown in the drawings for illustrative purposes so as to be indicative of springs in the respective locations).

Figure 8:
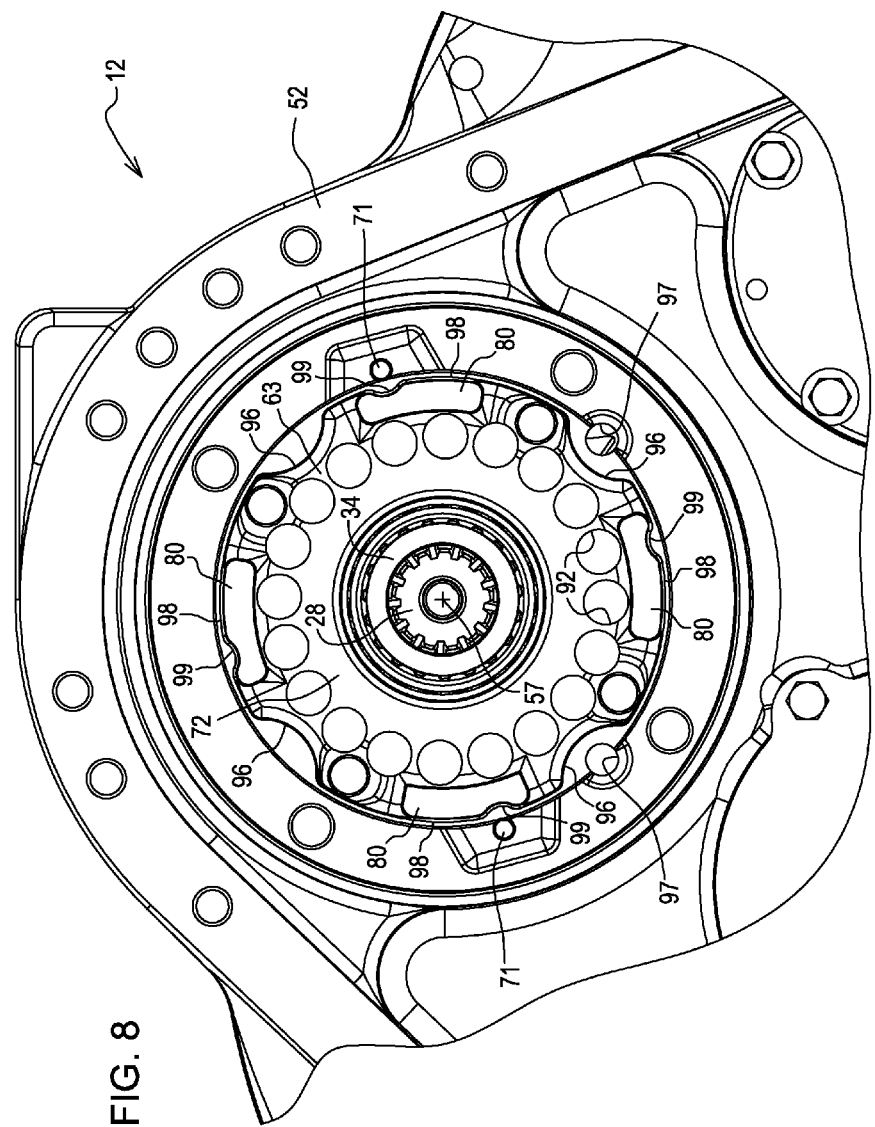
FIG. 8 is an elevation view showing a quill that has a perforated disk having a radially outer periphery notched to provide clearance for drainage holes in the housing and having circumferentially-spaced ears with radially outer notches two of which are respectively angularly aligned with the two dowels to account for manufacturing variations.

Referring to FIG. 8, the quill 63 has at least one notch 96 in its radially outer periphery relative to the rotation axis 57. The notch 96 is angularly aligned with a drainage hole 97 in the first housing body 52 relative to the rotation axis 57 to provide clearance for fluid to flow through the notch 96 between the quill 63 and the housing 26 to the drainage hole 97. The fluid may be, for example, hydraulic fluid used to lubricate and cool the gearbox 12 (e.g., hydraulic oil). In the illustrated example, the first housing body 52 has two such drainage holes 97 circumferentially spaced about the radially outer periphery of the quill 63 relative to the rotation axis 57, such that the quill 63 has two notches 96 angularly aligned respectively with the two drainage hole 97 relative to the rotation axis 57 (i.e., the quill 63 may have two notches 96). The quill 63 exemplarily has four notches 96 spaced circumferentially about the radially outer periphery of the quill 63 relative to the rotation axis 57, so that the quill 64 is symmetrical, promoting easy of assembly. Fluid enters an interior region of an input unit 106 of the gearbox 12 in response to meshing of the input gear 36 and the gear 38 of the cluster gear ("splash-lubrication"). The drainage holes 97 provide a return path for the fluid to return from the input unit 106 to the main interior region of the housing 26. The first housing body 52 may have a single drainage hole 97.

At least one of the ears 80 has a notch 99 angularly aligned with a dowel 71 relative to the rotation axis 57, allowing for manufacturing variation between the quill 63 and the dowel 71. A radially outer surface 98 of such ear 80 relative to the rotation axis 57 has the notch 99 receiving the dowel 71. Since there may be two dowels 71, two ears 80 may be so configured. Exemplarily, each ear 80 is so configured, so that the quill 64 is symmetrical, promoting ease of assembly.

Figure 9:
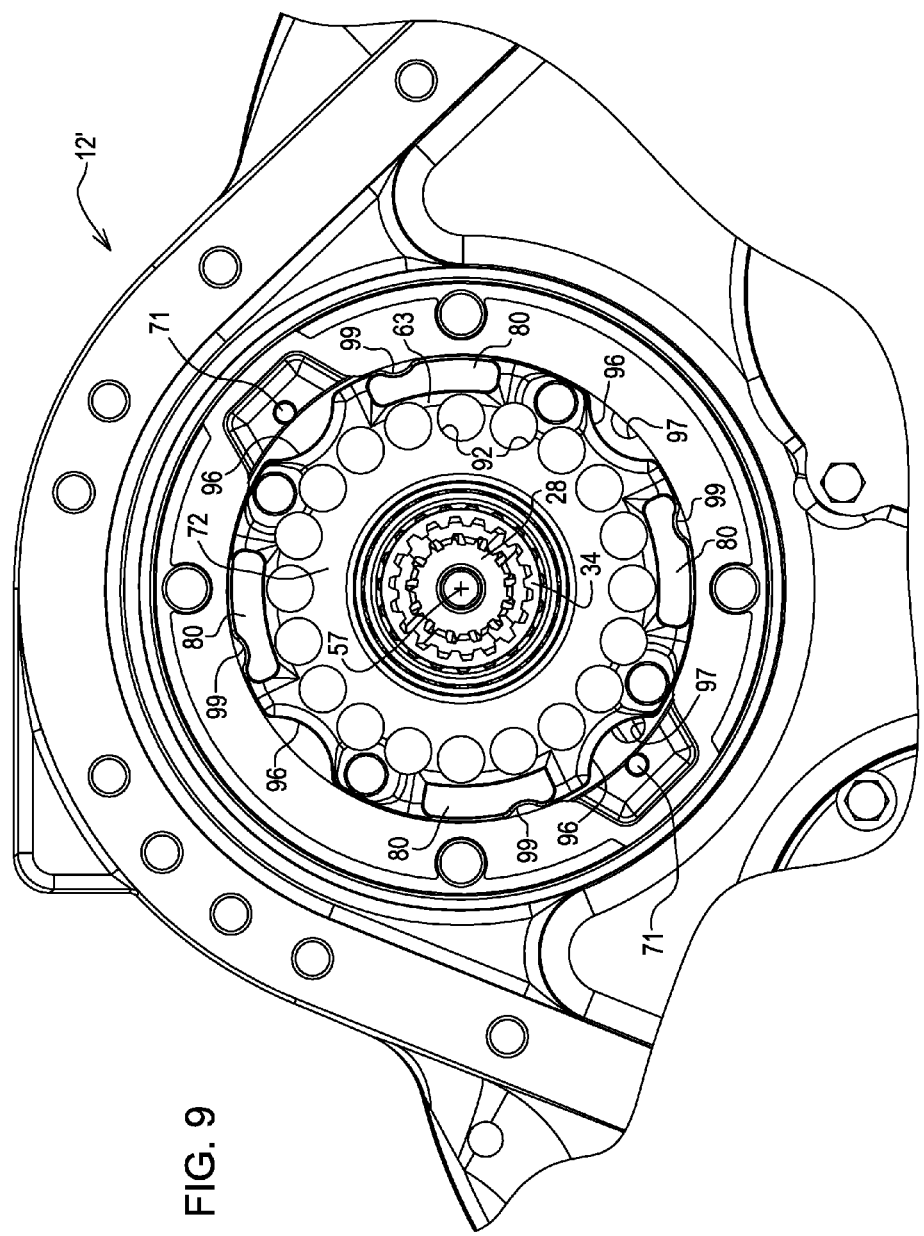
FIG. 9 is an elevation view showing the quill in a gearbox on the opposite side of the work vehicle.
Figure 10:
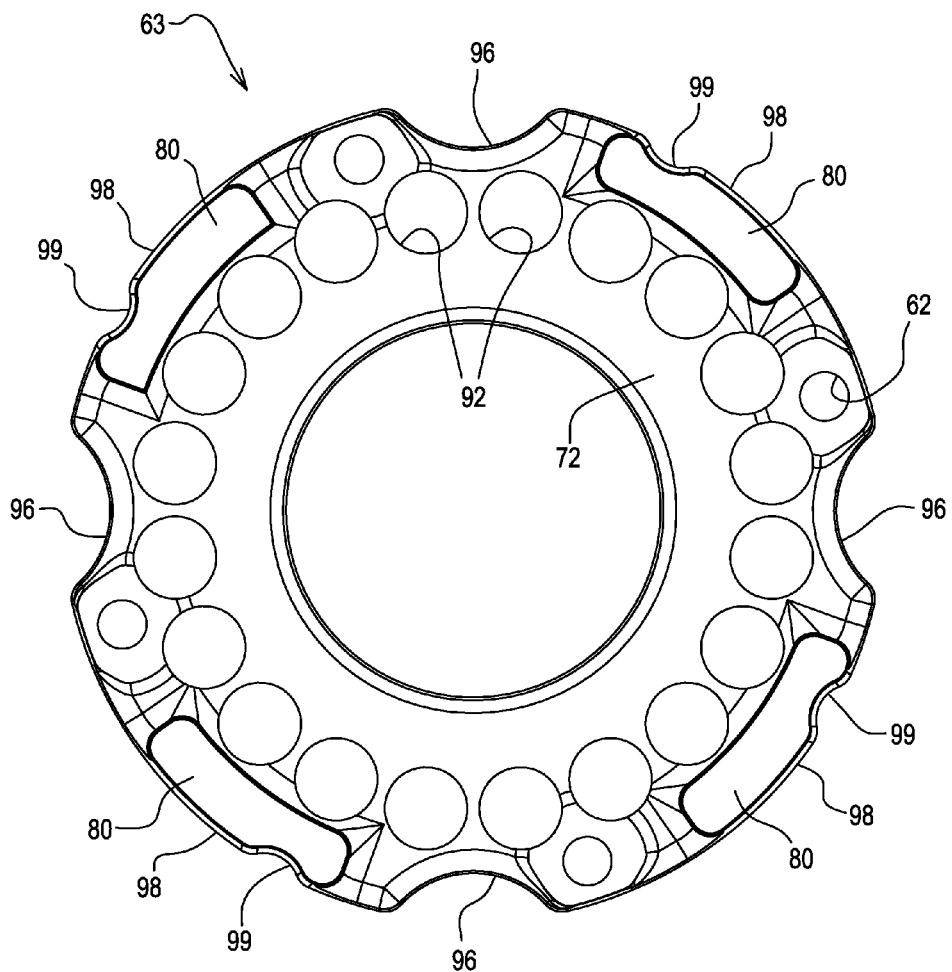
FIG. 10 is an elevation view of the quill.

Referring to FIG. 9, the quill 63 is shown as part of a right-hand gearbox 12' for use as a final drive on the right-hand side of the vehicle 10. The gearbox 12' is similar to the gearbox 12. The dowels 71 and drainage holes 97 of the gearbox 12' may be oriented somewhat differently relative to the quill 63 as compared to the gearbox 12. For example, two of the notches 96 of the quill 63 may be angularly aligned respectively with the two dowels 71, allowing for manufacturing variation between the quill 63 and the dowels 71. One of the those notches 96 may also be at least partially angularly aligned with one of the drainage holes 97 relative to the rotation axis 57, and another notch 96 may be angularly aligned with the other drainage hole 97 relative to the rotation axis 57, providing clearance for fluid to flow through the notch 96 between the quill 63 and the housing 26 to the drainage hole 97.

Figure 11:
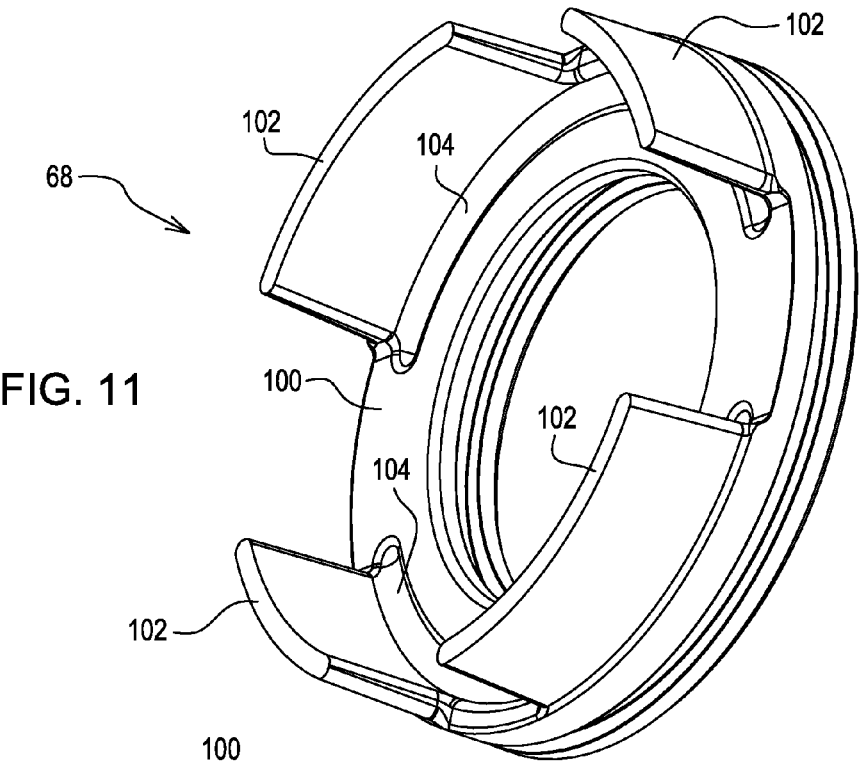
FIG. 11 is a perspective view of a piston of a brake of the gearbox.
Figure 12:
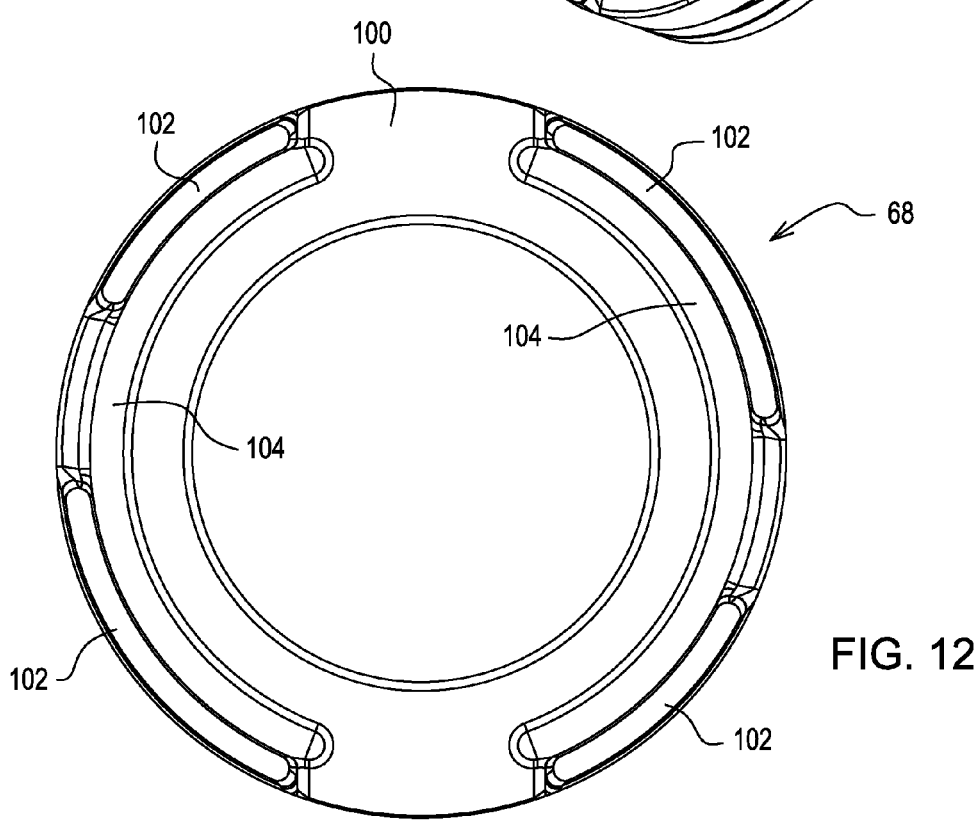
FIG. 12 is an elevation view of the piston.

Referring to FIGS. 11 and 12, in the illustrated example, the piston 68 has a ring 100 and legs 102 spaced circumferentially about the rotation axis 57. The ring has a radially outer groove extending circumferentially around the radially outer periphery of the ring and receiving an O-ring seal of the brake release 65 therein to establish a sealed connection between the piston 68 and the third housing body 70. The ring 100 has a radially inner groove extending circumferentially around the radially inner periphery of the ring 100 and receiving an O-ring seal of the brake release 65 therein to establish a sealed connection between the piston 68 and the third housing body 70. The legs 102 extend axially from the ring 100 relative to the rotation axis 57. An axial face of the ring 100 has a pair of circumferential grooves 104. The piston 68 may take any suitable configuration for releasing the brake 64 in response to hydraulic pressure.

An input unit 106 of the gearbox 12 thus includes the input shaft 28, the bearings 58, 60, the quill 63, any shims between the quill 63 and the first housing body 52, the springs 90, the brake 64, the brake release 65, the dowels 71, the third housing body 70, respective portions of the first housing body 52, the seal between the housing bodies 52, 70, and fasteners 61, 77.

The quill 63 promotes compactness of the input unit 106 and speed and ease of assembly of the input unit 106. The quill 63 is arranged and configured to load the bearing 60 axially and limit axial travel of the piston 68, promoting the compactness of the input unit 106.

Use of the quill 63 promotes speed and ease of assembly of the input unit 106. During assembly, the gearbox 12 is oriented such that the rotation axis 57 is vertical. The outer race of the first bearing 58 is pressed into the first housing body 52.

The rolling unit and the inner race are then installed, the rolling unit including the rolling elements and the cage holding the rolling elements. The input shaft 28 is installed on the first bearing 58. The inner race and the rolling unit of the second bearing 60 are installed on the input shaft 28, and the outer race of the second bearing 60 is pressed into the cup 82 of the quill 63. The quill 63 and the outer race pressed therein are installed such that the quill 63 is angularly aligned with the dowels 71 already installed, or the holes that receive the dowels 71 if the dowels 71 are not yet installed, and the drainage holes 97. Before fastening of the quill 63 with the fasteners 61, any gap between the disk 72 of the quill 63 and the surface 93 of the housing wall 74 is measured to determine how many, if any, shims to place between the disk 72 and the surface 93 in order load the bearing 60 so as to limit axial endplay of the input shaft 28 as desired. The shims, if any, are installed between the disk 72 and the surface 93, and the quill 63 is fastened in place with the fasteners 61. The bearing 60 is thus pre-loaded axially with the quill 63 in a relatively quick and easy manner, avoiding a time-consuming process involving selecting and installing a properly sized snap ring in the housing to set the bearing pre-load and endplay.

To continue with assembly of the input unit 106, the springs 90 are positioned respectively in the spring-receiving holes 92. The coupler 34 is installed on the input shaft 28. After the dowels 71 are installed in the first housing body 52, the reaction plate 94 is installed on the ears 80 of the quill 63 in angular alignment with the dowels 71. The brake pack 73 is installed on the reaction plate 94, with the brake disks 66 splined on the coupler 34 and the brake plates 67 in angular alignment with the dowels 71. The third housing body 70, with the piston 68 pre-assembled to the third housing body 70, is then fastened to the first housing body 52 with the fasteners 77, with a seal between the housing bodies 52, 70.

The quill 63 is thus used to set the axial endplay of the first and second bearings 58, 60 and the input shaft 28 relative to the rotation axis 57. In so doing, the quill 63 axially and radially locates the outer race 84 of the second bearing 60 (known as a "cup" in the case of a tapered roller bearing) relative to the rotation axis 57 such that the desired endplay setting is achieved. The quill 63 retains the brake piston 68, and is exemplarily used to locate the springs 90. The quill 63 may thus be a multi-function component promoting compactness of the input unit 106 and speed and ease of assembly of the input unit 106.

For ease of representation, the threaded members referred to herein are shown in simplified, unthreaded form, it being understood that such members would be threaded. Further, for ease of representation, the O-rings shown in the drawings are depicted in their relaxed state, it being understood that they would deform upon compression in actual use.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A gearbox, comprising:
   a housing,
   a bearing positioned within the housing,
   a shaft positioned within the bearing to rotate relative to the housing about a rotation axis,
   a gear set positioned within the housing and operably coupled to the shaft,
   a brake for braking rotation of the shaft about the rotation axis,
   a hydraulic brake release for releasing the brake to rotate about the rotation axis,
   an annular quill detachably fastened to and enclosed within the housing, the brake release comprising a piston configured to move axially toward the quill relative to the rotation axis to release the brake in response to hydraulic pressure, the quill positioned in contact with the bearing so as to load the bearing axially relative to the rotation axis and positioned to limit axial brake-releasing movement of the piston relative to the rotation axis, and
   springs urging yieldably the brake toward a braking configuration, wherein the quill comprises spring-receiving through-holes receiving respectively the springs, and the springs are positioned in contact with the housing.

2. The gearbox of claim 1, wherein the quill comprises an annular disk and ears spaced circumferentially relative to the rotation axis and projecting axially from the disk relative to the rotation axis to limit axial, brake-releasing movement of the piston relative to the rotation axis.

3. The gearbox of claim 2, wherein the ears are positioned radially outwardly from the springs relative to the rotation axis.

4. The gearbox of claim 2, wherein the brake comprises a brake pack and a reaction plate, the brake pack and the piston are positioned on a first side of the reaction plate, the quill and the springs are positioned on a second side of the reaction plate opposite the first side, the piston contacts the reaction plate, the springs contact the reaction plate so as to urge yieldably the brake toward the braking configuration, and the ears contact the reaction plate so as to limit axial, brake-releasing movement of the piston relative to the rotation axis when the brake release is activated.

5. The gearbox of claim 1, wherein the quill comprises an annular disk extending radially along a wall of the housing relative to the rotation axis, a ring projecting from the disk in a first axial direction radially between the bearing and the housing wall relative to the rotation axis, and ears projecting from the disk in a second axial direction opposite the first axial direction relative to the rotation axis to limit brake-releasing movement of the piston in the first axial direction, and the disk and the ring cooperate to provide an annular cup in which an outer race of the bearing is nested.

6. The gearbox of claim 5, wherein the disk comprises an outer portion radially outwardly from the ring relative to the rotation axis and an inner portion radially inward from the ring relative to the rotation axis, the inner portion and the ring cooperate to provide the cup, and the ears project axially from the outer portion relative to the rotation axis.

7. The gearbox of claim 6, wherein the outer portion comprises the spring-receiving through-holes spaced circumferentially relative to the rotation axis and extending axially through the disk relative to the rotation axis, and the ears are spaced circumferentially relative to the rotation axis and positioned radially outwardly from the springs relative to the rotation axis.

8. The gearbox of claim 1, wherein the quill comprises at least one ear positioned to limit axial, brake-releasing movement of the piston relative to the rotation axis.

9. The gearbox of claim 1, wherein the gearbox is a final drive for a work vehicle, and the gearbox is configured to provide a rotary speed reduction from a propulsion input of the work vehicle to a propulsion output of the work vehicle.

10. A gearbox, comprising:
    a housing,
    a bearing positioned within the housing,
    a shaft positioned within the bearing to rotate relative to the housing about a rotation axis,
    a gear set positioned within the housing and operably coupled to the shaft,
    a brake for braking rotation of the shaft about the rotation axis,
    a hydraulic brake release for releasing the brake to rotate about the rotation axis,
    an annular quill mounted to the housing, the brake release comprising a piston configured to move axially toward the quill relative to the rotation axis to release the brake in response to hydraulic pressure, the quill positioned in contact with the bearing so as to load the bearing axially relative to the rotation axis and positioned to limit axial, brake-releasing movement of the piston relative to the rotation axis,
    the quill comprises an annular disk and ears spaced circumferentially relative to the rotation axis and projecting axially from the disk relative to the rotation axis to limit axial brake-releasing movement of the piston relative to the rotation axis, and
    a dowel, wherein the brake comprises at least one brake plate comprising a notch receiving the dowel, and an ear of the ears comprises a notch receiving the dowel.

11. A gearbox, comprising:
    a housing,
    a bearing positioned within the housing,
    a shaft positioned within the bearing to rotate relative to the housing about a rotation axis,
    a gear set positioned within the housing and operably coupled to the shaft,
    a brake for braking rotation of the shaft about the rotation axis,
    a hydraulic brake release for releasing the brake to rotate about the rotation axis, and
    an annular quill mounted to the housing, the brake release comprising a piston configured to move axially toward the quill relative to the rotation axis to release the brake in response to hydraulic pressure, the quill positioned in contact with the bearing so as to load the bearing axially relative to the rotation axis and positioned to limit axial, brake-releasing movement of the piston relative to the rotation axis, wherein the quill comprises at least one notch in its radially outer periphery relative to the rotation axis to allow fluid to flow therethrough between the quill and the housing.

12. A gearbox, comprising:
    a housing,
    a bearing positioned within the housing,
    a shaft positioned within the bearing to rotate relative to the housing about a rotation axis,
    a gear set positioned within the housing and operably coupled to the shaft,
    a brake for braking rotation of the shaft about the rotation axis,
    a hydraulic brake release for releasing the brake to rotate about the rotation axis, and an annular quill mounted to the housing, the brake release comprising a piston configured to move axially toward the quill relative to the rotation axis to release the brake in response to hydraulic pressure, the quill positioned in contact with the bearing so as to load the bearing axially relative to the rotation axis and positioned to limit axial, brake-releasing movement of the piston relative to the rotation axis, wherein the quill comprises an annular disk extending radially along a wall of the housing relative to the rotation axis, a ring projecting from the disk in a first axial direction radially between the bearing and the housing wall relative to the rotation axis, and ears projecting from the disk in a second axial direction opposite the first axial direction relative to the rotation axis to limit brake-releasing movement of the piston in the first axial direction, the disk and the ring cooperate to provide an annular cup in which an outer race of the bearing is nested, the disk comprises an outer portion radially outwardly from the rind relative to the rotation axis and an inner portion radially inward from the ring relative to the rotation axis, the inner portion and the ring cooperate to provide the cup, and the ears project axially from the outer portion relative to the rotation axis, and springs, wherein the outer portion comprises spring-receiving holes spaced circumferentially relative to the rotation axis and extending axially through the disk relative to the rotation axis, the springs are positioned respectively in the receiving holes, the ears are spaced circumferentially relative to the rotation axis and positioned radially outwardly from the springs relative to the rotation axis, and the outer portion comprises notches spaced circumferentially about its radially outer periphery relative to the rotation axis for fluid to flow therethrough between the quill and the housing.

13. The gearbox of claim 12, comprising a dowel, wherein the brake comprises at least one brake plate comprising a notch receiving the dowel, and a radially outer surface of an ear of the ears relative to the rotation axis comprises a notch receiving the dowel.

* * * * *